United States Patent
Erez

(10) Patent No.: US 10,169,063 B2
(45) Date of Patent: Jan. 1, 2019

(54) HYPERVISOR CAPABILITY ACCESS PROVISION

(71) Applicant: Red Hat Israel, Ltd., Raanana (IL)

(72) Inventor: Daniel Erez, Tel Aviv (IL)

(73) Assignee: Red Hat Israel, LTD., Raanana (IL)

( * ) Notice: Subject to any disclaimer, the term of this patent is extended or adjusted under 35 U.S.C. 154(b) by 172 days.

(21) Appl. No.: 14/188,399

(22) Filed: Feb. 24, 2014

(65) Prior Publication Data

US 2015/0242230 A1 Aug. 27, 2015

(51) Int. Cl.
*G06F 9/455* (2018.01)

(52) U.S. Cl.
CPC ............ *G06F 9/45558* (2013.01); *G06F 2009/45587* (2013.01)

(58) Field of Classification Search
CPC . G06F 9/45533; G06F 9/5077; G06F 9/45537
USPC .............................................................. 718/1
See application file for complete search history.

(56) References Cited

U.S. PATENT DOCUMENTS

| | | | |
|---|---|---|---|
| 2009/0307713 A1* | 12/2009 | Anderson | G06F 11/0712 719/313 |
| 2013/0055398 A1* | 2/2013 | Li et al. | 726/25 |
| 2013/0275596 A1* | 10/2013 | Subramaniam | 709/226 |
| 2014/0019960 A1* | 1/2014 | Jacklin et al. | 718/1 |
| 2015/0046920 A1* | 2/2015 | Allen | 718/1 |
| 2015/0160961 A1* | 6/2015 | Johnson et al. | 718/1 |

* cited by examiner

*Primary Examiner* — Li B. Zhen
*Assistant Examiner* — Zengpu Wei
(74) *Attorney, Agent, or Firm* — Lowenstein Sandler LLP

(57) ABSTRACT

An apparatus receives virtualization manager indication of a capability selected from a virtualization manager capability subset. The apparatus receives non-virtualization manager indication of a selected capability not in said subset. The apparatus passes virtualization manager indication of a result of the capability selected from the subset. The apparatus passes non-virtualization manager indication of a result of the capability not in said subset.

20 Claims, 6 Drawing Sheets

HYPERVISOR CAPABILITY ACCESS PROVISION

TECHNICAL FIELD

This disclosure relates to the field of virtualization and, in particular, to the provision of access to hypervisor capabilities.

BACKGROUND

Within a virtualization environment, a hypervisor may possess various capabilities beyond providing emulation. For instance, a hypervisor may be able to start and stop virtual machines, provide storage to virtual machines, and/or provide networking to virtual machines.

Moreover, a user (e.g., a system administrator) may be afforded access to hypervisor capabilities. However, such access is typically funneled through a virtualization manager, with the user's access to hypervisor capabilities being constrained to whatever subset of those capabilities is designed to be offered via the virtualization manager.

BRIEF DESCRIPTION OF THE DRAWINGS

The present disclosure is illustrated by way of example, and not by way of limitation, in the figures of the accompanying drawings.

DETAILED DESCRIPTION

Within a virtualization environment, a hypervisor may possess various capabilities beyond providing emulation. For instance, a hypervisor may be able to start and stop virtual machines, provide storage to virtual machines, and/or provide networking to virtual machines. With the passage of time, the hypervisor may gain additional capabilities (e.g., in connection with releases of new version of the hypervisor).

Moreover, a user (e.g., a system administrator) may be afforded access to hypervisor capabilities. However, such access is typically funneled through a virtualization manager, with the user's access to hypervisor capabilities being constrained to whatever subset of those capabilities is designed to be offered via the virtualization manager. Not only might certain existing hypervisor capabilities be excluded from those available to the user, but the gap between broader capabilities of the hypervisor and those available to the user may widen with time as, say, version releases of the hypervisor outstrip those of the virtualization manager.

Set forth herein are examples of approaches by which a user may be able to more broadly access hypervisor capabilities. According to an example, a user may be allowed access to hypervisor capabilities in a fashion that bypasses the virtualization manager. A user interface may, through bypassing the virtualization manger, directly access the hypervisor via a hypervisor accessor. In so doing the user interface may allow the user to access hypervisor capabilities which would have been inaccessible had he remained limited to virtualization manager-constrained access. Moreover, according to an example, the hypervisor accessor may query the hypervisor as to the hypervisor's full range of capabilities, and then the full range of capabilities may be made available to the user via the user interface. According to an additional example, capabilities may be offered to the user which go beyond the raw capabilities of the hypervisor.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely examples. Particular implementations may vary from these example-only details and still be contemplated to be within the scope of the present invention.

Figure 1:
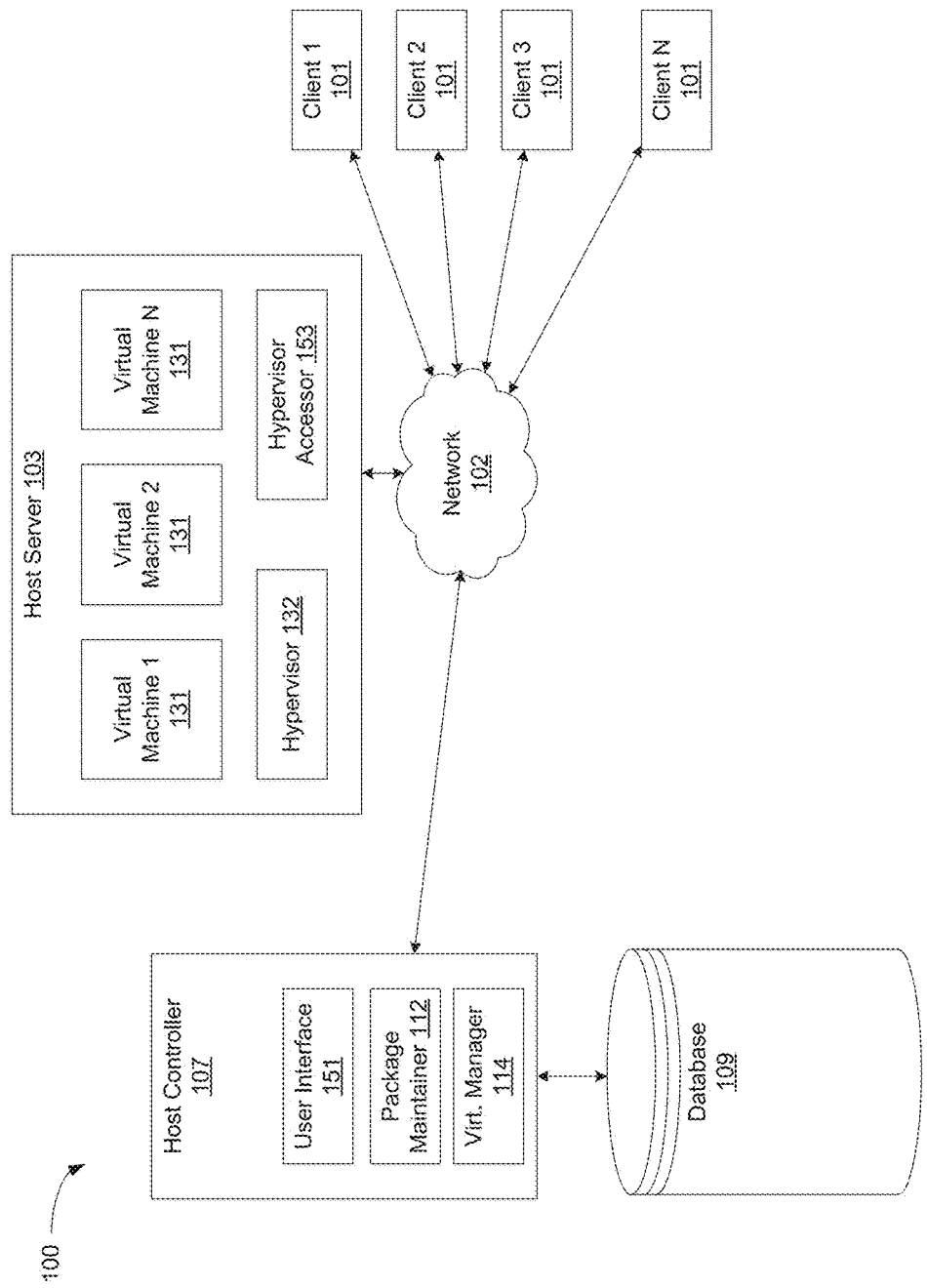
FIG. 1 illustrates an example network architecture in which examples of the present invention may operate.

FIG. 1 illustrates an example network architecture 100 in which examples of the present invention may operate. The network architecture 100 includes one or more host servers 103 coupled to clients 101 over a network 102. The network 102 may be a private network (e.g., a local area network (LAN), wide area network (WAN), intranet, etc.) or a public network (e.g., the Internet). The host servers 103 may also be coupled to a host controller 107 (via the same or a different network or directly). Host controller 107 may be an independent machine such as a server computer, a desktop computer, etc. Alternatively, the host controller 107 may be part of the host servers 103. In one example, the network architecture 100, including host controller 107, host servers 103 and clients 101, may be referred to as a virtualization environment.

In one example, the clients 101 may include computing devices that have a wide range of processing capabilities. Some or all of the clients 101 may be thin clients, which serve as access terminals for users and depend primarily on the host servers 103 for processing activities. For example, the client 101 may be a desktop computer, laptop computer, cellular phone, personal digital assistant (PDA), etc. The client 101 may run client applications such as a Web browser. The client 101 may also run other client applications, which receive multimedia data streams or other data from the host server 103 and re-direct the received data to a local display or other user interface.

Host servers 103 may include server computers or any other computing devices capable of running one or more virtual machines 131. Each virtual machine 131 runs a guest operating system (OS) that may be different from one virtual machine to another. The guest OS may include Microsoft Windows, Linux, Solaris, Mac OS, etc. The host server 103 may include a hypervisor 132 that emulates the underlying hardware platform for the virtual machines 131. The hypervisor 132 may also be known as a virtual machine monitor (VMM) or a kernel-based hypervisor. The host server 103 may include hypervisor accessor 153. As discussed in greater detail hereinbelow, hypervisor accessor 153 may perform operations including allowing a user access to hypervisor capabilities in a fashion that bypasses the virtualization manager.

Each virtual machine 131 can be accessed by one or more of the clients 101 over the network 102 and can provide a virtual desktop for the client(s) 101. From the user's point of view, the virtual desktop functions as a physical desktop (e.g., a personal computer) and is indistinguishable from a physical desktop. Each virtual machine 131 may be linked to one or more virtual disks. These virtual disks can be logical partitions of a physical disk managed by hypervisor 132, can be cloud based storage devices, or can be some other type of virtual storage device. In one example, virtual disks may form a whole or part of a logical data center. In one example, virtual machines 131 and virtual disks, together with host servers 103, may be collectively referred to as entities in a virtual machine system.

The virtual machines 131 and virtual disks are managed by the host controller 107. Host controller 107 may manage the allocation of resources from host server 103 to virtual machines 131. In addition, host controller may monitor the status of virtual machines 131 as well as the progress of commands and processes being executed by virtual machines 131 and/or on virtual machines 131. The host controller 107 may include a virtualization manager 114 to perform management operations in the virtualization system, including for example allocating resources of host servers 103 to virtual machines 131, monitoring the status of virtual machines 131, monitoring the progress of commands and processes being executed by virtual machines 131, etc. The host controller 107 may include user interface 151. As discussed in greater detail hereinbelow, user interface 151 may perform operations including directly accessing the hypervisor via hypervisor accessor 153, thus bypassing virtualization manager 114. The host controller 107 may also maintain a management database 109 used by the virtualization manager 114 for the above management operations.

In one example, host controller 107 also includes a package maintainer 112 to install, upgrade, or configure software packages on the host controller 107 in a consistent manner. For example, the package maintainer 112 may be used to install or upgrade the virtualization manager 114 on the host controller 107.

Figure 2:
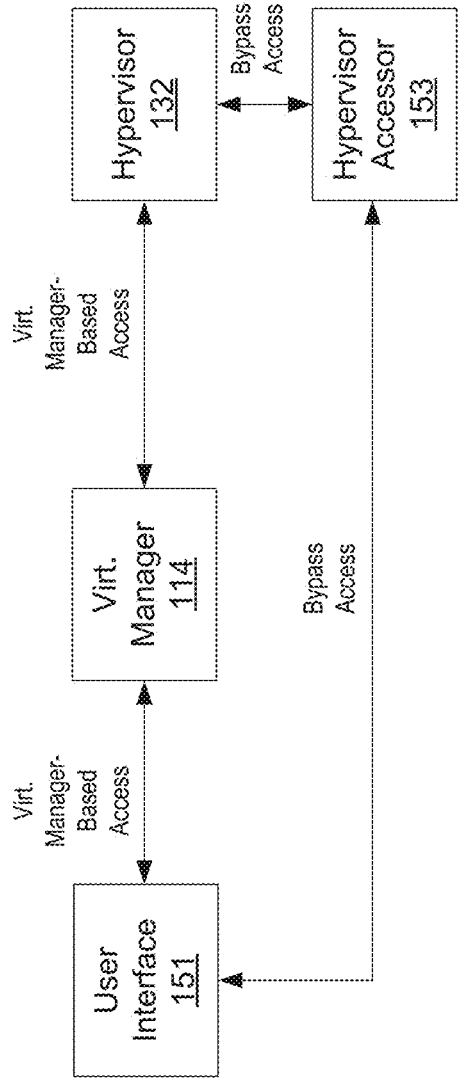
FIG. 2 sets forth operations involving provision of access to hypervisor capabilities, according to an example.

FIG. 2 sets forth one example of operations involving provision of access to hypervisor capabilities. The operations may be performed by processing logic that comprises hardware (e.g., circuitry, dedicated logic, programmable logic, microcode, etc.), software (such as instructions run on a processing device), or a combination thereof. As one example, the operations may be performed by a user interface running on a computing device, a hypervisor accessor running on a computing device, a virtualization manager running on a computer device, and a hypervisor running on a computing device For instance, the operations may be performed by user interface 151 running on host controller 107, hypervisor accessor 153 running on host server 103, virtualization manager 114 running on host controller 107, and hypervisor 132 running on host server 103.

In a first aspect, illustrated by way of FIG. 2 is user interface 151 providing access to capabilities of hypervisor 132 via virtualization manager 114. As one example, such provision of access may involve user interface 151 (e.g., via a Graphical User Interface (GUI)) offering one or more of the subset of hypervisor 132's capabilities which are being made available by virtualization manager 132, receiving user selection of one or more of those capabilities, receiving one or more elements of user input to be employed in connection with the selected capabilities, and/or passing to virtualization manager 114 that which has been received from the user. Virtualization manager 114 may then provide to hypervisor 132 corresponding indication of the one or more selected capabilities, and/or appropriate information which will allow the selected one or more capabilities to be carried out. As one illustration, a selected capability might relate to providing a virtual machine of hypervisor 132 with access to a virtual Local Area Network (vLAN), and the elements of user input may regard indication of the vLAN to be applied and of the virtual machine to which the vLAN is to be applied.

Hypervisor 132 may then perform one or more operations to carry out the requested one or more capabilities (e.g., to carry out provision of the vLAN). Having done so hypervisor 132 may pass one or more capability results to virtualization manager 114 (e.g., indication of successful provision of a vLAN to a virtual machine). Virtualization manager 114 may then provide corresponding information (e.g., regarding the successful vLAN provision) to user interface 151, and user interface 151 may display corresponding indication to the user (e.g., indication that the vLAN has been successfully provisioned).

Such interplay amongst user interface 151, virtualization manager 114, and hypervisor 132 may, for example, involve the employ of interprocess communication (e.g., XML-Remote Procedure Call (XML-RPC) Web Toolkit-Remote Procedure Call (GWT-RPC)). User interface 151 may, for example, learn via interprocess communication of the subset of hypervisor 132's capabilities which are being made available by virtualization manager 132.

In a second aspect, illustrated by way of FIG. 2 is user interface 151 providing access to capabilities of hypervisor 132 without involving virtualization manager 114. Relative at least to the virtualization manager capabilities access discussed hereinabove, such access not involving virtualization manager 114 might be viewed access provision which bypasses virtualization manager 114.

As one example such provision of access may involve user interface 151 (e.g., via a GUI) offering one or more of hypervisor 132's capabilities including ones beyond the subset of capabilities which has been made available by virtualization manager 114, receiving user selection of one or more of those capabilities, receiving one or more elements of user input to be employed in connection with the selected capabilities, and/or passing to hypervisor accessor 153 that which has been received from the user. Hypervisor accessor 153 may then provide to hypervisor 132 corresponding indication of the one or more selected capabilities, and/or appropriate information which will allow the selected one or more capabilities to be carried out. As one illustration, a selected capability might relate to a user learning of the statuses (e.g., pending, executing, and/or completed) of one or more tasks (e.g., disk image deletions) being handled by hypervisor 132, with the user perhaps indicating particular jobs for which status is desired or indicating a desire to learn of all jobs.

Hypervisor 132 may then perform one or more operations to carry out the requested one or more capabilities (e.g., to carry out provision of the requested task statuses). Having done so hypervisor 132 may pass one or more results to hypervisor accessor 153 (e.g., indication of the requested task statuses). Hypervisor accessor 153 may then provide corresponding information (e.g., regarding the requested task statuses) to user interface 151, and user interface 151 may display corresponding indication to the user (e.g., indication of the task statuses).

In a first aspect, illustrated by way of FIG. 2 is user interface 151 providing access to capabilities of hypervisor 132 via virtualization manager 114. As one example, such provision of access may involve user interface 151 (e.g., via a Graphical User Interface (GUI)) offering one or more of the subset of hypervisor 132's capabilities which are being made available by virtualization manager 132, receiving user selection of one or more of those capabilities, receiving one or more elements of user input to be employed in connection with the selected capabilities, and/or passing to virtualization manager 114 that which has been received from the user. Virtualization manager 114 may then provide to hypervisor 132 corresponding indication of the one or more selected capabilities, and/or appropriate information which will allow the selected one or more capabilities to be carried out. As one illustration, a selected capability might relate to providing a virtual machine of hypervisor 132 with access to a virtual Local Area Network (vLAN), and the elements of user input may regard indication of the vLAN to be applied and of the virtual machine to which the vLAN is to be applied.

With an eye towards host controller 107, it is observed that such employ of HTML and/or JavaScript does not call for, say, modification of virtualization manager 114. As such, for instance, virtualization manager code need not be changed. In like vein, with an eye towards host server 103, it is noted that such employ of CGI scripts does not call for, say, modification of hypervisor 132. As such, for example, hypervisor code need not be changed. At least in view of the avoidance of modifying virtualization manager code and the avoidance of modifying hypervisor code, the noted use of HTML, JavaScript, and CGI scripts may be viewed as being a plugin architecture.

As noted, hypervisor accessor 153 may employ the one or more CGI scripts in interface with hypervisor 132 via a command line tool of hypervisor 132. According to an example, via the CGI scripts hypervisor 153 may evoke the command line tool of hypervisor 132 in such a way so as to provide hypervisor 132 the information called for in order to perform execution of the at-hand capability (e.g., via one or more arguments passed to the command line tool), and/or to receive from the command line tool pass of a result of the execution of the capability (e.g., via a retrieval of the output of the command line tool, such as an output which might otherwise be routed to a terminal from which the command line tool was evoked and/or to a console or log). Moreover, via the CGI script access user interface 151 may receive the result and provide appropriate indication thereof to the user (e.g., via the employ of HTML and/or JavaScript).

Figure 3:
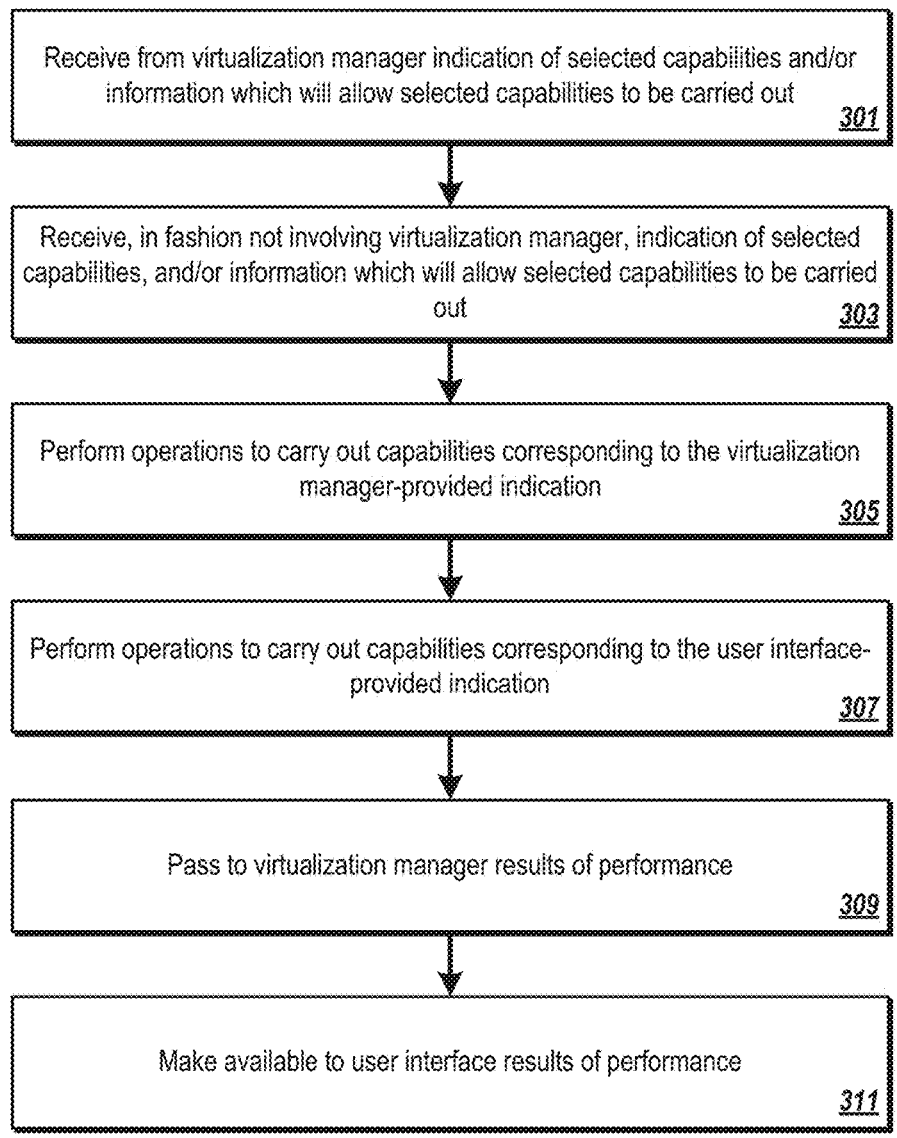
FIG. 3 is a flow diagram illustrating a method of providing access to hypervisor capabilities, according to an example.

FIG. 3 illustrates a flow diagram of one example of a method of providing access to hypervisor capabilities. The method may be performed by processing logic that comprises hardware (e.g., circuitry, dedicated logic, programmable logic, microcode, etc.), software (such as instructions run on a processing device), or a combination thereof. As one example, the method may be performed by a hypervisor accessor and a hypervisor running on a computing device. For instance, the method may be performed by hypervisor accessor 153 and hypervisor 132 running on host server 103. As one example, the operations discussed in connection with FIG. 3 may be performed in accordance with that which is discussed hereinabove in connection with FIG. 2.

Referring to FIG. 3, at block 301 the processing logic may, in accordance with that which is discussed in connection with FIG. 2, receive from virtualization manager 114 indication of one or more selected capabilities and/or information which will allow the selected one or more capabilities to be carried out.

At block 303 the processing logic may, in accordance with that which is discussed in connection with FIG. 2, receive from via user interface 151, in a fashion not involving virtualization manager 114, an indication of one or more selected capabilities, and/or information which will allow the selected one or more capabilities to be carried out.

At block 305 the processing logic may, in accordance with that which is discussed in connection with FIG. 2, perform one or more operations to carry out the one or more capabilities corresponding to the virtualization manager-provided indication.

At block 307 the processing logic may, in accordance with that which is discussed in connection with FIG. 2, perform one or more operations to carry out the one or more capabilities corresponding to the user interface-provided indication.

At block 309 the processing logic may, in accordance with that which is discussed in connection with FIG. 2, pass to virtualization manager 114 one or more results of the performance of the capabilities corresponding to the virtualization manager-provided indication.

At block 311, the processing logic may, in accordance with that which is discussed in connection with FIG. 2, make available to user interface 151—in a fashion not involving virtualization manager 114—one or more results of the performance of the capabilities corresponding to the indication received via user interface 151.

According to one example one or more particular hypervisor capabilities may be provided in a fashion that bypasses the virtualization manager. For instance, capabilities so provided may include, the ability to learn of the statuses (e.g., pending, executing, and/or completed) of one or more tasks (e.g., disk image deletions) being handled by the hypervisor (e.g., with the user perhaps indicating particular jobs for which status is desired or indicating a desire to learn of all jobs), the ability to learn of storage (e.g., storage clusters accessible to virtual machines of the hypervisor, the ability to learn of storage credential groupings (e.g., storage domains) accessible to virtual machines of the hypervisor, the ability to learn of virtual machines accessible via the hypervisor (e.g., with presentation in list and/or table form), the ability to get statistics (e.g., performance statistics) regarding the virtual machines of the hypervisor, the ability to get statistics (e.g., performance statistics) regarding the hypervisor itself, the ability to stop one or more virtual machines of the hypervisor, the ability to resume one or more virtual machines of the hypervisor, the ability to create one or more virtual machines to be hosted by the hypervisor, and/or the ability to establish user access (e.g., in a fashion employing Virtual Network Computing (VNC) or another approach allowing for GUI access) to one or more virtual machines of the hypervisor.

According to another example, all hypervisor capabilities may be provided in a fashion that bypasses the virtualization manager. For instance, one or more CGI scripts hosted by hypervisor accessor 153 may act to query the hypervisor as to the entirety of its capabilities (i.e., of the full set of all of its capabilities), provide via user interface 151 (e.g., via the employ of HTML and/or JavaScript) a user with the ability to select any of the entirety of hypervisor capabilities and to provide called-for user input, interface with the hypervisor to pass to the hypervisor indication of the selected ability and the called-for information to execute the selected capability, retrieve the result of the performance of the capability, and provide via user interface 151 (e.g., via the employ of HTML and/or JavaScript) an appropriate indication of that result.

According to another example, capabilities of host sever 103 beyond those of hypervisor 132 may be accessed via one or more CGI scripts hosted by the hypervisor accessor 153. Such access might be implemented in a fashion akin to that discussed herein in connection with accessing hypervisor 153 (e.g., the CGI scripts may access such additional host server capabilities via interface with one or more command lines tools or executables).

As an example, the employ of CGI scripts discussed herein—be it in connection with access to hypervisor 132, or host server 103 capabilities beyond those of hypervisor 132—may involve the setting of one or more permissions (e.g., by a system administrator and/or other user, and/or by the CGI scripts themselves and/or one or more automated processes). As another example there might not be such permissions setting (e.g., the CGI scripts may be able to perform called-for accesses even in absence of such permissions settings).

According to an additional example, capabilities may be offered to the user which go beyond the raw capabilities of the hypervisor. For instance, one or more of those raw capabilities may be employed as base upon which new capabilities are built. For example, CGI functionality in the vein of that discussed hereinabove may employ one more hypervisor capabilities within a code structure (e.g., a loop) to effect new capabilities. As illustrations, a capability to learn of a given, identified job status may be employed within a loop to learn of all job statuses, a capability to pause a given, identified job may be employed within a loop to pause all job statuses, and/or a capability to delete a given, identified job may be employed within a loop to delete all job statuses.

As discussed, hypervisor accessor employ may allow for access to hypervisor capabilities in a fashion that bypasses the virtualization manager. Such employ may allow a single user interface 153 to access multiple hypervisors. As one example, each such hypervisor may have its own hypervisor accessor (e.g., hosted by a corresponding host server of that hypervisor). As another example, a hypervisor accessor may allow access to multiple hypervisors. Such a hypervisor accessor might exist on a computing device (e.g., a server) apart from one or more host servers which include those hypervisors. Where the hypervisor accessor is on a different computing device than the hypervisor, interprocess communication may be employed (e.g., in hypervisor command line tool access).

Figure 4A:
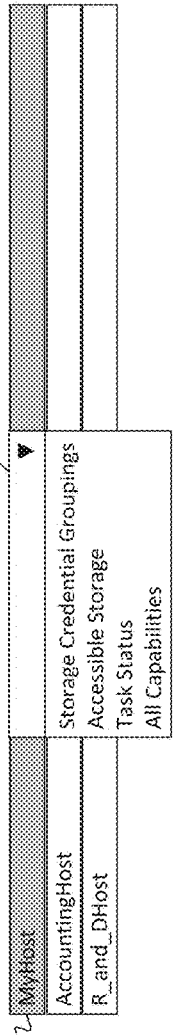
FIGS. 4A, 4B, and 4C illustrate graphical user interfaces (GUIs), according to an example.
Figure 4B:
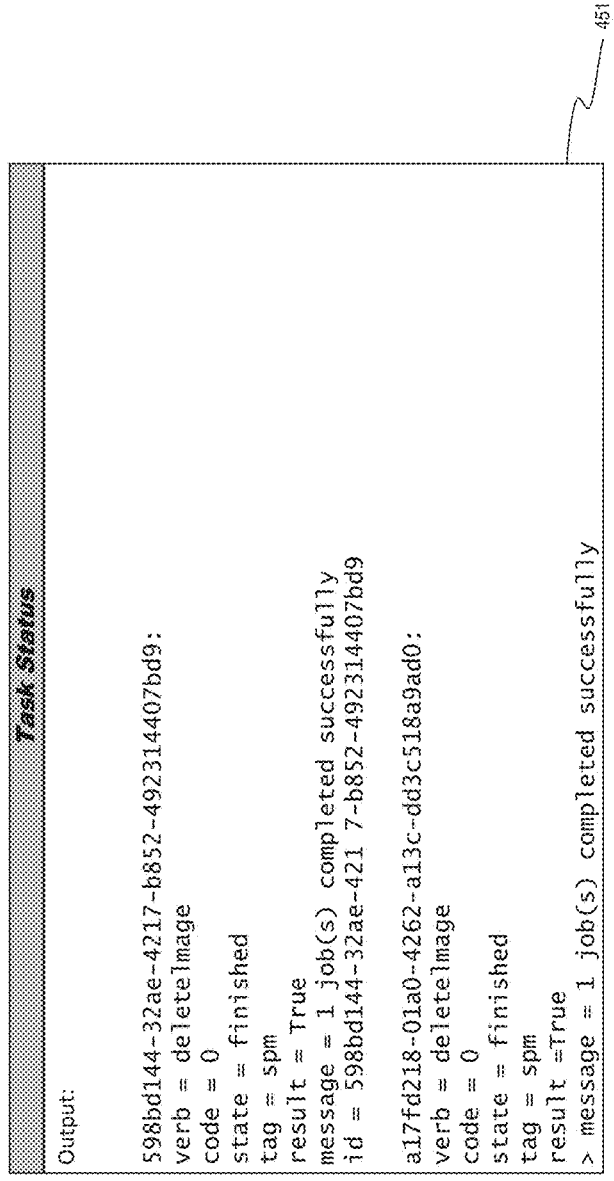
Figure 4C:
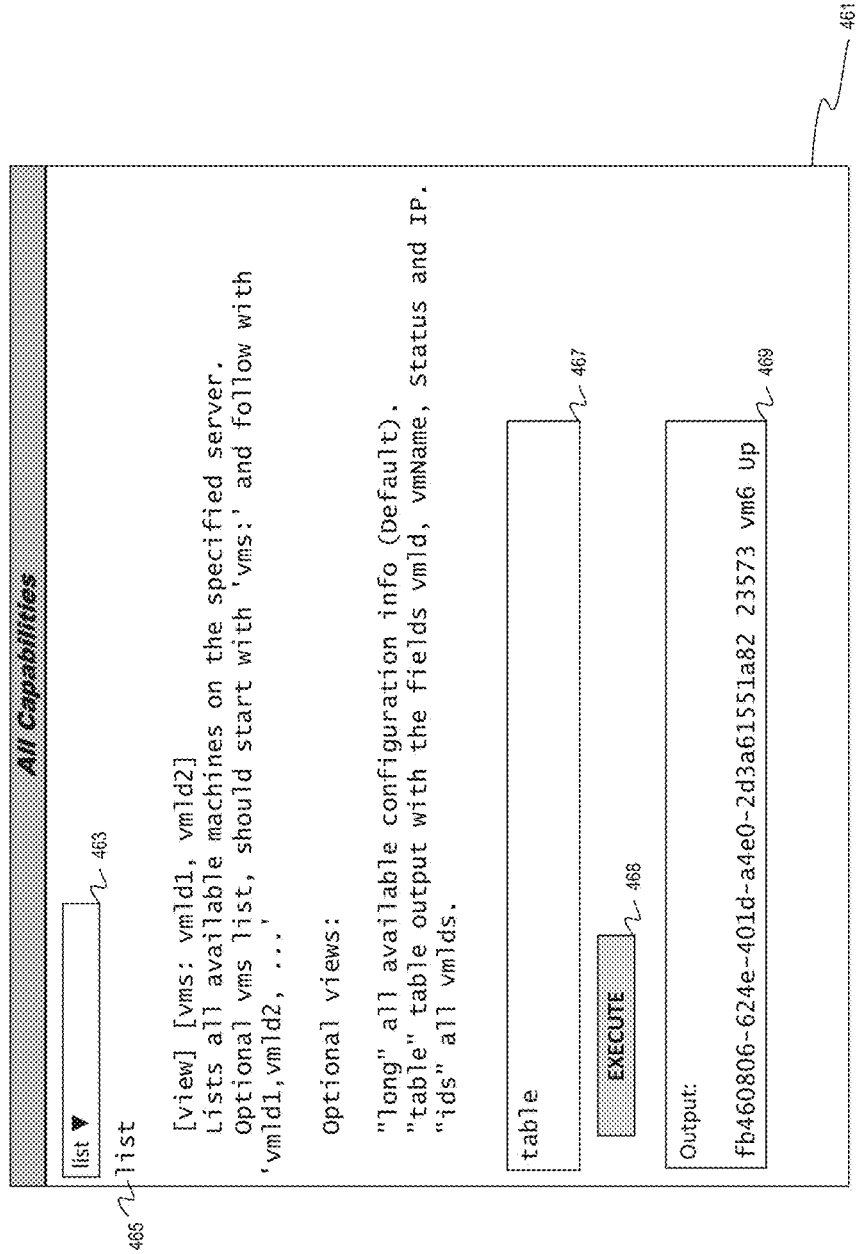

FIGS. 4A-4C illustrate example GUIs in accordance with that which has been set forth hereinabove. Shown in FIG. 4A is pulldown GUI element 431 which has been displayed subsequent to activation (e.g., right-clicking) of selectable GUI element 433. Selectable GUI element 433 sets forth "MyHost," a name of a host server 103. Pulldown GUI element 431 offers for selection four host server capabilities of the sort discussed herein. In particular, offered for selection by pulldown GUI element 431 are the host server capabilities "Storage Credential Groupings," "Accessible Storage," "Task Status," and "All Capabilities." "Storage Credential Groupings" refers to the discussed capability of allowing a user to learn of storage credential groupings. "Accessible Storage" refers to the discussed capability of allowing a user to learn of storage accessible to virtual machines of the hypervisor. "Task Status" refers to the discussed capability of allowing a user to learn of the statuses of one or more tasks being handled by the hypervisor. "All Capabilities" refers to the discussed capability of all hypervisor capabilities being provided in a fashion that bypasses the virtualization manager.

Shown in FIG. 4B is an example popup window GUI element 451 corresponding to an example scenario in which "Task Status" has been selected via Pulldown GUI element 431 of FIG. 4A. Shown is a corresponding "Task Status" output. Shown in FIG. 4C is an example popup window GUI element 461 corresponding to an example scenario in which, firstly, "All Capabilities" has been selected via Pulldown GUI element 431 of FIG. 4A. Subsequently according to the example, pulldown GUI element 463 has allowed from selection amongst all of the capabilities of the hypervisor and the capability "list" has been selected. Then according to the example scenario, popup window element 461 produced information 465 regarding the selected "list" capability, with popup window element 461 further providing field GUI element 467. Entered into this field element has been the "table" view option set forth by information 465, and activated has been button GUI element 468. Then, responsive to the button activation, shown has been "list" output 469.

Figure 5:
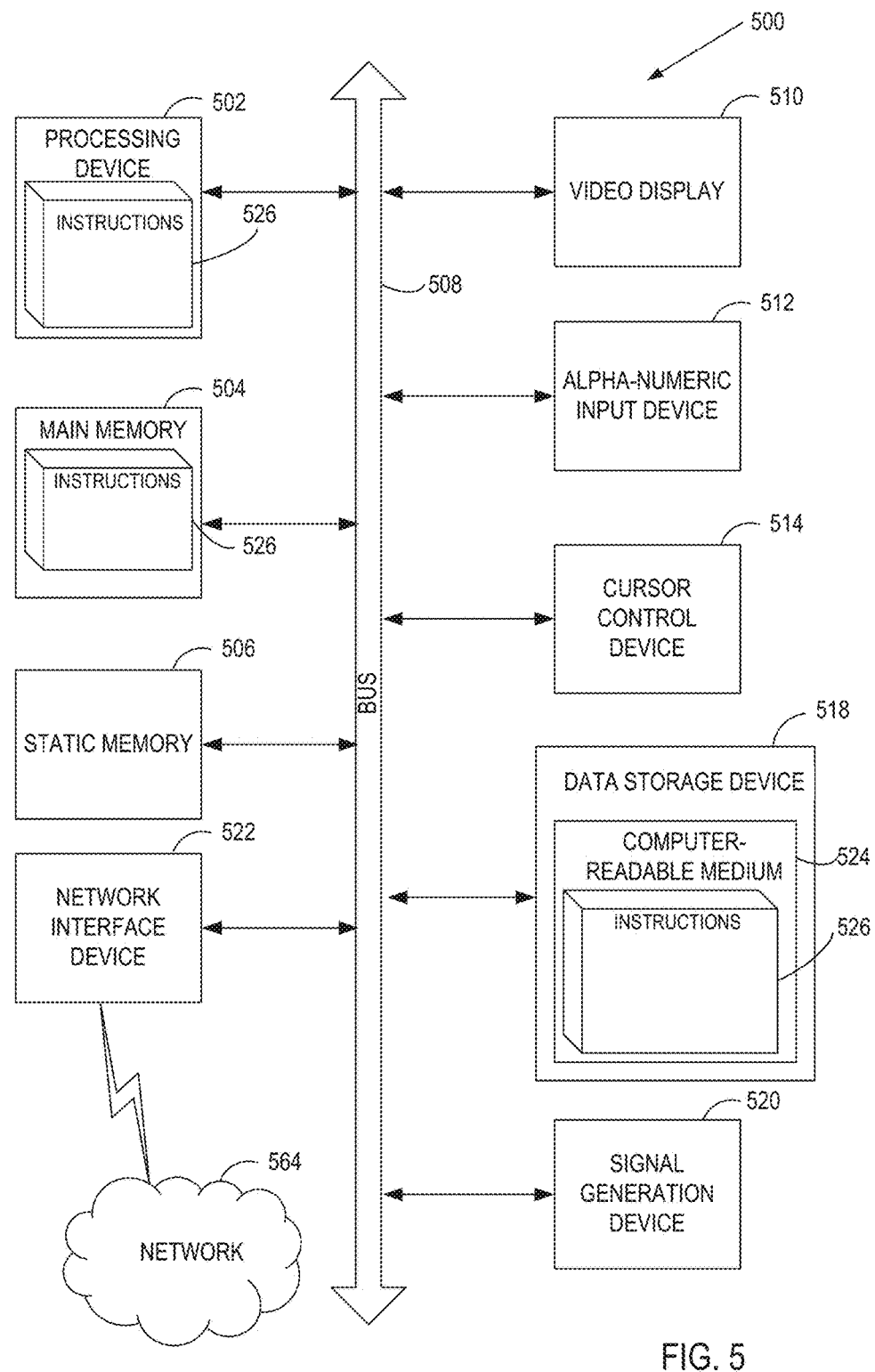
FIG. 5 is a diagrammatic representation of a machine, according to an example.

FIG. 5 illustrates a diagrammatic representation of a machine in the example form of a computing device 500 within which a set of instructions, for causing the machine to perform any one or more of the methodologies discussed herein, may be executed. In alternative examples, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory (e.g., a data storage device 518), which communicate with each other via a bus 508.

Processing device 502 represents one or more general-purpose processors such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the processing logic (instructions 526) for performing the operations and steps discussed herein.

The computing device 500 may further include a network interface device 522. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 518 may include a machine-readable storage medium (or more specifically a computer-readable storage medium) 524 on which is stored one or more sets of instructions 526 embodying any one or more of the methodologies or functions described herein. The instructions 526 may also reside, completely or at least partially, within the main memory 504, within the static memory 506 and/or within the processing device 502 during execution thereof by the computer system 500, the main memory 504, static memory 506 and the processing device 502 also constituting computer-readable storage media.

While the computer-readable storage medium 524 is shown in an example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner. It is to be understood that the above description is intended to be illustrative, and not restrictive. Many other embodiments will be apparent upon reading and understanding the above description. Although embodiments of the present invention have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled. Furthermore, the terms "first," "second," "third," "fourth," etc. as used herein are meant as labels to distinguish among different elements and may not necessarily have an ordinal meaning according to their numerical designation.

What is claimed is:

1. A method, comprising:
   receiving, via a user interface provided by a host controller, a first request for a first hypervisor capability of a hypervisor executing on a host server;
   determining, by a processing device, that the first hypervisor capability can be provisioned by a virtualization manager executing on the host controller in view of inclusion within a hypervisor capability subset offered by the virtualization manager;
   receiving, via the user interface, a second request for a second hypervisor capability of the hypervisor;
   determining, by the processing device, that the virtualization manager cannot provision the second hypervisor capability in view of lack of inclusion within the hypervisor capability subset offered by the virtualization manager;
   providing, via the user interface, a first indication of successful provision of the first hypervisor capability in response to the first hypervisor capability being provisioned by the virtualization manager; and
   providing, via the user interface, a second indication of successful provision of the second hypervisor capability in response to the second hypervisor capability being provisioned by a hypervisor accessor bypassing the virtualization manager and using one or more first common gateway interface (CGI) scripts hosted by the hypervisor accessor to directly access the hypervisor via a command line tool of the hypervisor, wherein a set of hypervisor capabilities is accessible by the hypervisor accessor executing on the host server, the set comprising the hypervisor capability subset that is accessible by the virtualization manager and a plurality of hypervisor capabilities that are inaccessible by the virtualization manager, the plurality of hypervisor capabilities comprising the second hypervisor capability.

2. The method of claim 1, further comprising receiving, via the user interface, a request for a full set of hypervisor capabilities, wherein the full set comprises the second hypervisor capability that is not included in the hypervisor capability subset.

3. The method of claim 1, wherein the second hypervisor capability is employed as a base for a capability outside of a full set of capabilities.

4. The method of claim 1, wherein the virtualization manager interfaces with the hypervisor via inter process communication.

5. The method of claim 1 further comprising:
   receiving, via the user interface provided by the host controller, a third request for a third capability of the host server beyond capabilities of the hypervisor;
   determining, by the processing device, that the virtualization manager cannot provision the third capability in view of lack of inclusion within the hypervisor capability subset offered by the virtualization manager; and
   providing, via the user interface, a third indication of successful provision of the third capability in response to the third capability being provisioned by the hypervisor accessor bypassing the virtualization manager and using one or more second CGI scripts hosted by the hypervisor accessor to directly access the host server.

6. The method of claim 1, wherein the second hypervisor capability that is not included in the hypervisor capability subset comprises one of a task status request or a storage query.

7. The method of claim 1, wherein the request for the second hypervisor capability comprises information employable in execution of the second hypervisor capability.

8. An apparatus, comprising:
   a memory; and
   a processing device communicably coupled to the memory, the processing device to execute instructions to:
      receive, via a user interface provided by a host controller, a first request for a first hypervisor capability of a hypervisor executing on a host server;
      determine that the first hypervisor capability can be provisioned by a virtualization manager executing on the host controller in view of inclusion within a hypervisor capability subset offered by the virtualization manager;
receive, via the user interface, a second request for a second hypervisor capability of the hypervisor;
determine that the virtualization manager cannot provision the second hypervisor capability in view of lack of inclusion within the hypervisor capability subset offered by the virtualization manager;
provide, via the user interface, a first indication of successful provision of the first hypervisor capability in response to the first hypervisor capability being provisioned by the virtualization manager; and
provide, via the user interface, a second indication of successful provision of the second hypervisor capability in response to the second hypervisor capability being provisioned by a hypervisor accessor bypassing the virtualization manager and using one or more first common gateway interface (CGI) scripts hosted by the hypervisor accessor to directly access the hypervisor via a command line tool of the hypervisor, wherein a set of hypervisor capabilities is accessible by the hypervisor accessor executing on the host server, the set comprising the hypervisor capability subset that is accessible by the virtualization manager and a plurality of hypervisor capabilities that are inaccessible by the virtualization manager, the plurality of hypervisor capabilities comprising the second hypervisor capability.

9. The apparatus of claim 8, wherein the processing device further executes instructions to receive a request, via the user interface, for a full set of hypervisor capabilities, wherein the full set comprises the second hypervisor capability that is not included in the hypervisor capability subset.

10. The apparatus of claim 8, wherein the second hypervisor capability is employed as a base for a capability outside of a full set of capabilities.

11. The apparatus of claim 8, wherein the virtualization manager interfaces with the hypervisor via inter process communication.

12. The apparatus of claim 8, wherein the processing device further executes instructions to:
receive, via the user interface provided by the host controller, a third request for a third capability of the host server beyond capabilities of the hypervisor;
determine that the virtualization manager cannot provision the third capability in view of lack of inclusion within the hypervisor capability subset offered by the virtualization manager; and
provide, via the user interface, a third indication of successful provision of the third capability in response to the third capability being provisioned by the hypervisor accessor bypassing the virtualization manager and using one or more second CGI scripts hosted by the hypervisor accessor to directly access the host server.

13. The apparatus of claim 8, wherein the second hypervisor capability that is not included in the hypervisor capability subset comprises one of a task status request or a storage query.

14. The apparatus of claim 8, wherein the request for the second hypervisor capability comprises information employable in the execution of the second hypervisor capability.

15. A non-transitory machine-readable storage medium storing instructions which, when executed by a processing device, cause the processing device to:

receive, via a user interface provided by a host controller, a first request for a first hypervisor capability of a hypervisor executing on a host server;
determine, by the processing device, that the first hypervisor capability can be provisioned by a virtualization manager executing on the host controller in view of inclusion within a hypervisor capability subset offered by the virtualization manager;
receive, via the user interface, a second request for a second hypervisor capability of the hypervisor;
determine, by the processing device, that the virtualization manager cannot provision the second hypervisor capability in view of lack of inclusion within the hypervisor capability subset offered by the virtualization manager;
provide, via the user interface, a first indication of successful provision of the first hypervisor capability in response to the first hypervisor capability being provisioned by the virtualization manager; and
provide, via the user interface, a second indication of successful provision of the second hypervisor capability in response to the second hypervisor capability being provisioned by a hypervisor accessor bypassing the virtualization manager and using one or more first common gateway interface (CGI) scripts hosted by the hypervisor accessor to directly access the hypervisor via a command line tool of the hypervisor, wherein a set of hypervisor capabilities is accessible by the hypervisor accessor executing on the host server, the set comprising the hypervisor capability subset that is accessible by the virtualization manager and a plurality of hypervisor capabilities that are inaccessible by the virtualization manager, the plurality of hypervisor capabilities comprising the second hypervisor capability.

16. The non-transitory machine-readable storage medium of claim 15, wherein the processing device is further to receive, via the user interface, a request for a full set of hypervisor capabilities, wherein the full set of hypervisor capabilities comprises the second hypervisor capability that is not included in the hypervisor capability subset.

17. The non-transitory machine-readable storage medium of claim 15, wherein the second hypervisor capability is employed as a base for a capability outside of a full set of capabilities.

18. The non-transitory machine-readable storage medium of claim 15, wherein the request for the second hypervisor capability comprises information employable in the execution of the second hypervisor capability.

19. The method of claim 1, wherein the virtualization manager allocates resources of the host server to one or more virtual machines executing on the host server, monitors status of the one or more virtual machines, and monitors progress of commands and processes being executed by the one or more virtual machines.

20. The non-transitory machine-readable storage medium of claim 15, wherein the processing device is further to:
receive, via the user interface provided by the host controller, a third request for a third capability of the host server beyond capabilities of the hypervisor;
determine that the virtualization manager cannot provision the third capability in view of lack of inclusion within the hypervisor capability subset offered by the virtualization manager; and
provide, via the user interface, a third indication of successful provision of the third capability in response to the third capability being provisioned by the hypervisor accessor bypassing the virtualization manager and using one or more second CGI scripts hosted by the hypervisor accessor to directly access the host server.

\* \* \* \* \*